Figure 1:
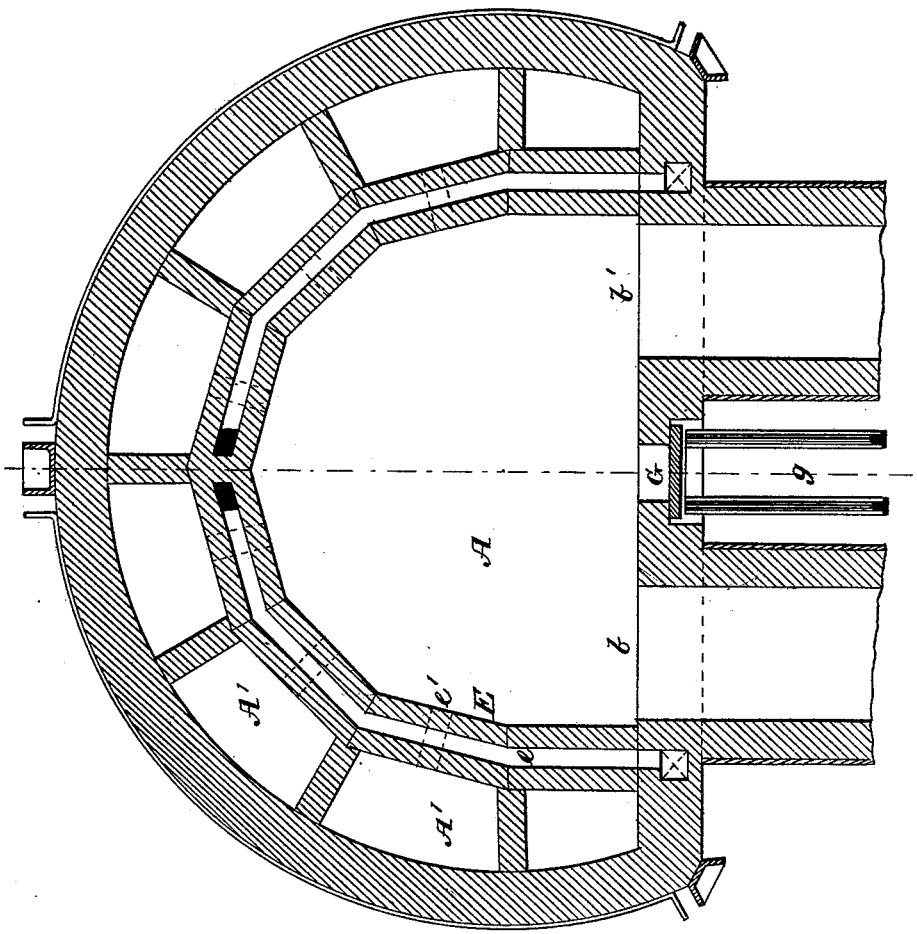

(No Model.)

C. W. SIEMENS.
Glass Melting Furnace.

No. 229,846.  Patented July 13, 1880.

Witnesses:
M. M. Bagleigh.
M. M. Johnson.

Inventor:
C. W. Siemens
by C. S. Whitman Att'y.

United States Patent Office.

CHARLES WILLIAM SIEMENS, OF WESTMINSTER, ENGLAND.

GLASS-MELTING FURNACE.

SPECIFICATION forming part of Letters Patent No. 229,846, dated July 13, 1880.

Application filed June 14, 1880. (No model.) Patented in England April 28, 1875.

*To all whom it may concern:*

Be it known that I, CHARLES WILLIAM SIEMENS, of Westminster, England, have invented certain Improvements in the Construction and Methods of Working Glass-Melting Furnaces, for which I have obtained a patent for Great Britain, No. 1,551, bearing date the 28th day of April, in the year of our Lord 1875, of which the following is a specification.

Formerly in the manufacture of glass the materials were first charged into glass pots or tanks, then melted down, and then worked out completely; after which they were recharged and the process repeated. The loss of time and other disadvantages resulting from this method of working were, in a measure, obviated by the new process and apparatus described in Letters Patent of the United States No. 127,806, granted to me on the 11th day of June, in the year of our Lord 1872, in which was described a regenerative tank-furnace for the continuous melting of glass, constructed with transverse partitions dividing the tank into compartments, through which the melted materials were made to flow, while the gas and air ports were arranged along each side of the tank, so as to cause the flame to play transversely across the same. By the use of this continuous-melting furnace a full and uninterrupted melting-heat could be employed and no time was lost in cooling and settling the metal and reheating the furnace. The tank was rendered more durable by being subjected to a uniform temperature, and an economy in labor was effected in lessening the number of workmen required for the melting operations.

My present invention relates to continuous glass-melting furnaces of this class; and the nature thereof consists in constructing the tank in the form of a horseshoe or segment of a circle, with the feeding-door and communications to and from the regenerator arranged on the flat side of the segment, for the purpose of cooling the exterior surface of the tank and rendering it available for working-out holes.

My invention also consists in constructing the tank in the form of a horseshoe or segment of a circle and arranging a series of working-out compartments on the inner side of the curvilinear wall, each compartment communicating by means of a passage with the melting-chamber.

The annexed drawing is a sectional plan of a tank of this construction.

A is the melting-chamber, at one side or end of which are placed four regenerators. One pair of these air and gas regenerators communicate with the said melting-chamber through passages situated one above the other at the point marked $b'$, while the other pair communicate through corresponding passages with the melting-chamber at the point marked $b$. The gas and air passing into the chamber through one set of passages at $b'$ becomes ignited, sweeps round the melting-chamber, and escapes through the passages at $b$ to the other pair of regenerators.

E is the fixed bridge, with a passage, $e$, formed through it to a flue or flues at one side for the circulation of air, and with apertures $e'$ $e'$ at the bottom, through which the finer metal passes from the melting-chamber A into the compartments A', whence it is worked out through openings or working-holes formed in the sides of the tank. These openings or working-holes are not shown in the drawing, but may be of any form and construction which may be deemed preferable.

The bridge E is constructed in the form of a horseshoe or arc of a circle, and the compartments A' are arranged between it and the curvilinear wall of the tank.

The feeding-door G is situated between the passages leading to the regenerators, and the feeding-truck is run forward to this door upon the rails $g$.

Having thus described my invention, I claim and desire to secure by Letters Patent of the United States—

1. A continuous glass-melting furnace having a tank in the form of a segment of a circle or other suitable curve, and regenerators arranged on the flat side thereof, as and for the purpose described.

2. A glass-melting tank in the form of a segment of a circle or other proper curve, having a feeding-door on the flat side thereof, and working-out doors arranged around the curved side thereof, as and for the purpose described.

C. WILLIAM SIEMENS.

Witnesses:
CHAS. ROCHE,
THOS. MARCH,
*Both of 2 Waterloo Place, Pall Mall, London,
Notary's Clerks.*